United States Patent [19]

Holcombe et al.

[11] Patent Number: 5,108,670

[45] Date of Patent: Apr. 28, 1992

[54] PROCESS FOR MAKING A TITANIUM DIBORIDE-CHROMIUM DIBORIDE-YTTRIUM TITANIUM OXIDE CERAMIC COMPOSITION

[75] Inventors: Cressie E. Holcombe, Knoxville; Norman L. Dykes, Oak Ridge, both of Tenn.

[73] Assignee: Martin Marietta Energy Systems, Inc., Oak Ridge, Tenn.

[21] Appl. No.: 641,231

[22] Filed: Jan. 14, 1991

Related U.S. Application Data

[62] Division of Ser. No. 513,337, Apr. 20, 1990, Pat. No. 5,013,694.

[51] Int. Cl.$^5$ .................... H05B 6/00; C04B 35/58
[52] U.S. Cl. ....................... 264/26; 264/25; 264/56; 264/64; 219/10.55 M; 501/96
[58] Field of Search ............ 501/96; 219/10.55 M; 219/10.55 R; 264/25, 26, 56, 64

[56] References Cited

U.S. PATENT DOCUMENTS

| | | | |
|---|---|---|---|
| 3,171,009 | 2/1965 | Scheller et al. | 219/10.55 M |
| 3,585,258 | 6/1971 | Levinson | 264/26 |
| 4,057,702 | 11/1977 | Lacombe-Allard | 219/10.55 A |
| 4,100,386 | 7/1978 | Bardet | 219/10.55 M |
| 4,147,911 | 4/1979 | Nishitani | 219/10.55 M |
| 4,163,140 | 7/1979 | Bardet | 219/10.55 B |
| 4,189,629 | 2/1980 | Kraze | 219/10.55 A |
| 4,307,277 | 12/1981 | Maeda et al. | 219/10.55 R |
| 4,323,745 | 4/1982 | Berggren et al. | 219/10.55 A |
| 4,529,856 | 7/1985 | Meek et al. | 219/10.55 M |
| 4,529,857 | 7/1985 | Meek et al. | 219/10.55 M |
| 4,559,429 | 12/1985 | Holcombe | 219/10.55 M |
| 4,565,669 | 1/1986 | Collins et al. | 219/10.55 M |
| 4,605,634 | 8/1986 | DeAngelis | 501/96 |
| 4,683,363 | 7/1987 | Scovell | 219/10.55 A |
| 4,743,340 | 5/1988 | Wrenn, Jr. et al. | 162/152 |
| 4,757,172 | 7/1988 | Palaith et al. | 219/10.55 M |
| 4,764,102 | 8/1988 | Takahashi | 219/10.55 R |
| 4,771,153 | 9/1988 | Fukushima et al. | 219/10.55 B |
| 4,772,770 | 9/1988 | Matsui et al. | 219/10.55 M |
| 4,784,686 | 11/1988 | Meek et al. | 75/0.5 AC |
| 4,806,718 | 2/1989 | Seaborne et al. | 219/10.55 E |
| 4,808,780 | 2/1989 | Seaborne | 219/10.55 E |
| 4,810,846 | 3/1989 | Holcombe et al. | 219/10.55 R |
| 4,880,578 | 11/1989 | Holcombe et al. | 264/26 |

OTHER PUBLICATIONS

Farrior, Gilbert; "Corrosion Resistance of Diborides in the Pseudobinary System $TiB_2$-$CrB_2$", U.S. Dept of The Interior: Bureau of Mines, pp. 1-21, 1964.

C. E. Holcombe and N. L. Dykes, "High-Temperature Microwave Sintering of Nonoxide Ceramics," *91st Annual Meeting of the American Ceramics Society*, Apr. 25, 1989.

C. E. Holcombe, T. T. Meek, and N. L. Dykes "Unusual Properties of Microwave-Sintered Yttria-2 wt. % Firconia," *J. Mat'l Sc. Letters*, 7, 881-884 (1988).

C. E. Holcombe, T. T. Meek, and N. L. Dykes "Enhanced Thermal Shock Properties of $Y_2O_3$-2 wt. % $ZrO_2$ Heated Using 2.45 Ghz Radiation," *Mat. Res. Soc. Symp. Proc.*, vol. 124, Apr. 5-8 (1988).

W. H. Sutton, "Microwave Processing of Ceramic Materials," *Ceramic Bulletin*, vol. 68, No. 2, 376-286 (1989).

C. E. Holcombe, "New Microwave Coupler Material", *Am. Ceram. Soc. Bulletin*, vol. 62, 1388 (1983).

*Primary Examiner*—William R. Dixon, Jr.
*Assistant Examiner*—Anthony J. Green
*Attorney, Agent, or Firm*—Ivan L. Ericson; Harold W. Adams

[57] ABSTRACT

A ceramic composition composition is described. The ceramic composition consists essentially of from about 84 to 96 w/o titanium diboride, from about 1 to 9 w/o chromium diboride, and from about 3 to aobut 15 w/o yttrium-titanium-oxide. A method of making the ceramic composition is also described.

The method of making the ceramic composition comprises the following steps: Step 1—A consolidated body containing stoichiometric quantities of titanium diboride and chromium diboride is provided. Step 2—The consolidated body is enclosed in and in contact with a thermally insulated package of yttria granules having a thickness of at least 0.5 inches. Step 3—The consolidated body enclosed in the thermally insulated package of yttria granules is heated in a microwave oven with microwave energy to a temperature equal to or greater than 1,900 degrees centigrade to sinter and uniformly disperse yttria particles having a size range from about 1 to about 12 microns throughout the consolidated body forming a densified body consisting essentially of titanium diboride, chromium diboride, and yttrium-titanium-oxide. The resulting densified body has enhanced fracture toughness and hardness.

1 Claim, No Drawings

PROCESS FOR MAKING A TITANIUM DIBORIDE-CHROMIUM DIBORIDE-YTTRIUM TITANIUM OXIDE CERAMIC COMPOSITION

This invention was made with Government support under contract DE-AC05-84OR21400 awarded by the U.S. Department of Energy to Martin Marietta Energy Systems, Inc. and the Government has certain rights in this invention.

This application is a division of application Ser. No. 513,337, filed Apr. 20, 1990, now U.S. Pat. No. 5,013,694.

FIELD OF THE INVENTION

This invention relates to a ceramic composition and a process for making the same. More particularly, this invention relates to a titanium diboride-chromium diboride-yttrrium titanium oxide ceramic composition and a process for making the same.

BACKGROUND OF THE INVENTION

Titanium diboride materials are potential candidates for applications such as cutting tools, armor for tanks and helicopters, wear components, nozzles, liners, electrodes and high temperature utensils. However, sintered articles of titanium diboride are very brittle. The applicability of this material could be enhanced by lessening the brittleness in sintered articles. Consequently, it is desirable to lessen the brittleness in sintered articles and still retain the desirable properties associated with titanium boride.

SUMMARY OF THE INVENTION

In accordance with one aspect of the present invention, a new and improved ceramic composition consists essentially of from about 84 to 96 w/o titanium diboride, from about 1 to 9 w/o chromium diboride, and from about 3 to about 15 w/o yttrium-titanium-oxide.

In accordance with another aspect of the present invention, a new and improved method of making a ceramic composition comprises the following steps:

Step 1 —A consolidated body containing stoichiometric quantities of titanium diboride and chromium diboride is provided.

Step 2 —The consolidated body is enclosed in and in contact with a thermally insulated package of yttria granules. The thickness of the insulated package is at least 0.5 inches.

Step 3 —The consolidated body enclosed in the thermally insulated package of yttria granules is heated in a microwave oven with microwave energy to a temperature equal to or greater than 1,900 degrees centigrade to sinter and uniformly disperse yttria particles having a size range from about 1 to about 12 microns throughout the consolidated body forming a densified body consisting essentially of titanium diboride, chromium diboride, and yttrium-titanium-oxide. The resulting densified body has enhanced fracture toughness and hardness.

DETAILED DESCRIPTION OF THE PREFERRED EMBODIMENTS

The object of the subject invention is to provide a sintered article of a titanium boride material with high density, high hardness and high fracture toughness.

The invention is a sintered ceramic composite of titanium diboride, chromium diboride, yttrium-titanium-oxide and a process for making the same, wherein the sintered ceramic composite comprises:

a titanium diboride content ranging from 84 to 96 wt.%, a chromium diboride content ranging from 1 to 9 wt.% and a yttrium-titanium-oxide content ranging from 3 to 15 wt.% and, wherein the process for making the composite comprises the following steps:
1) consolidating stoichiometric quantities of titanium diboride and chromium diboride into a body;
2) enclosing the body in a thermally insulating package of yttria granules having a thickness of at least 0.5 inch with the body and yttria insulation in contact. The thickness being the distance between the body and the inside surface of a container containing the yttria granules; and
3) heating the yttria enclosed body in a microwave oven at a frequency of 2.45 GHz with microwave energy to a temperature ranging from 1900° to 2100° C. for sintering and uniformly dispersing yttrium-titanium-oxide particles ranging in size from 1-12 microns throughout the body of titanium diboride and chromium diboride to provide the ceramic composite of titanium diboride and chromium diboride containing uniformly dispersed yttrium-titanium-oxide particles which enhances the fracture toughness, hardness and density of the sintered body.

The particles of yttrium-titanium-oxide are obtained from the yttria granules of insulation. The yttria granules are vaporized at the sintering temperature and uniformly dispersed into the nonoxide ceramic. The chemical reaction is believed to be represented by the following equation: $TiB_2 + Y_2O_3$ (vapor) $\rightarrow Y-Ti-O + BO$ (vapor). The exact Y and Ti content in the titanium diboride-chromium diboride is variable since a portion of the yttria would react with the $TiB_2$ and another portion would condense in some fashion. The yttrium content is the predominant element in the oxide dispersion.

In a demonstration of the subject invention, numerous samples of titanium diboride-3 wt.% chromium diboride powders were consolidated into pellets for use in experimental sintering operations. Pellets were sintered at a temperature of 1900° C. for 5, 15, 30, 60 and 90 minutes; and pellets were sintered at temperatures of 2000° and 2100° C. for 5, 15, 30, 60 and 90 minutes. The yttria granules were dispersed into all the pellets.

In the sintering operations at 1900° C., pellets were sintered in a conventional furnace in an atmosphere of argon. The physical properties of the conventionally sintered pellets are listed as conv. sintered in Table 1. Pellets were enclosed in a thermally insulating package of yttria having a thickness of 0.5 inch to 1 inch with the pellets and yttria insulation in contact. These pellets were sintered in a microwave oven with microwave energy. The physical properties of these microwave sintered pellets are listed as microwave uncovered in Table 1. Finally, pellets were covered with a protective coating to preclude contamination by the yttria. The coated pellets were enclosed in a thermally insulating package of yttria having a thickness of 0.5 inch to 1 inch. These pellets were sintered in a microwave oven with microwave energy. The physical properties for these pellets are listed as microwave covered in Table 1.

In the sintering operations at a temperature of 2100° C., pellets were sintered in a conventional furnace in an atmosphere of argon. The physical properties of the sintered pellets are listed as conv. sintered in Table 1. Pellets were enclosed in a thermally insulating package of yttria having a thickness of 0.5 inch to 1 inch with the pellets and yttria insulation in contact. These pellets were sintered in a microwave oven with microwave energy. The physical properties for these microwave sintered pellets are listed as microwave uncovered in Table 1. Also, pellets were covered with a protective coating to preclude yttria from contaminating the pellets. The coated pellets were enclosed in a thermally insulating package of yttria having a thickness of 0.5 inch to 1 inch. These pellets were sintered in a microwave oven with microwave energy. The physical properties for these pellets are listed as microwave covered in Table 1.

The subject ceramic composite has a higher fracture toughness, hardness and density that the conventionally sintered composite and the essentially yttria-free microwave sintered composite. Also, the grain size of the subject composite is smaller than the other two composites that were tested. The grain size and yttria content of the subject composite and the other two composites were determined by actual optical measurements and microprobe.

A microprobe evaluation indicated that 3 to 8 wt.% of yttria in the form of particles had entered the pellets during the microwave sintering operation on the pellets in contact with yttria grit. Also, the evaluation indicated that the yttria was uniformly dispersed in the pellets of titanium diboride-3 wt.% chromium diboride. The yttria particles in the pellets had a grain size ranging from 1 to 12 microns with a typical size of 5 microns. These yttria particles appear to have entered into the composite by evaporation-diffusion from the yttria-grit thermal insulation in the form of yttrium and/or yttrium and oxygen. As a result, a new ceramic composite was discovered.

In an experimental program, an effort was made to determine the amount of chromium diboride required for production of the subject ceramic composite. Chromium diboride contents ranging from 0 to 10% were added to the titanium diboride. These experiments indicated that the subject ceramic composite required a chromium diboride content ranging from 1 to 10 wt.% The titanium diboride would not sinter without some chromium diboride; however, the chromium diboride separated from the titanium diboride about a chromium diboride content of 10 wt.%. The melting point of chromium diboride is about 2200° C., whereas the melting point of titanium diboride is above 3000° C. Apparently, the liquid chromium diboride flows from the composite during the sintering operation.

The subject composite should be useful in governmental and industrial applications such as cutting tools, wear components, armor and nozzles. The addition of yttria to the composite increases the fracture toughness, hardness and lessens the grain size of the subject composite. Consequently, the applicability should be improved for the subject composite.

While there has been shown and described what is at present considered the preferred embodiment of the invention, it will be obvious to those skilled in the art that various changes and modifications may be made therein without departing from the scope of the invention as defined by the appended claims.

TABLE 1

| | PHYSICAL PROPERTIES OF $TiB_2$ - 3% $CrB_2$ SPECIMENS | | | | | |
|---|---|---|---|---|---|---|
| | 1900° C., 30 min | | | 2100° C., 30 min | | |
| | μwaved Uncovered** | Conv Sintered | μwaved Covered | μwaved Uncovered** | Conv Sintered | μwaved Covered |
| Fracture Toughness* (MPa · m$^{\frac{1}{2}}$) | 6.2 | 5.7 | 5.2 | 6.1 | 6.1 | 5.3 |
| Vickers Hardness (GPa) | 16 | 9 | 15 | 18 | 11 | 14 |
| Average Grain Size (μm) | 4 | 4 | 6 | 4 | 12 | 8 |
| Theoretical Density (%) | 95 | 84 | 94 | 98 | 90 | 94 |

*Using E = 530 GPa
**Contain ≦ 8 wt. % Yttrium-Titanium Oxide

What is claimed is:

1. A method of making a ceramic composition comprising the following steps:
   Step 1 —providing a stoichiometric mixture of a boride of titanium and a boride of chromium;
   Step 2 —consolidating said stoichiometric mixture of a boride of titanium and a boride of chromium to form a consolidated body;
   Step 3 —enclosing and contacting said consolidated body with a thermally insulated package of yttria granules, said insulated package having a thickness of at least 0.5 inches; and
   Step 4 —heating said consolidated body enclosed in the thermally insulated package of yttria granules with microwave energy to a temperature equal to or greater than 1900 degrees centigrade to sinter and uniformly disperse yttria particles having a size range from about 1 to about 12 microns throughout the consolidated body forming a densified body consisting essentially of titanium diboride, chromium diboride, and yttrium-titanium-oxide.

* * * * *